United States Patent
Klanica et al.

(10) Patent No.: US 6,620,877 B2
(45) Date of Patent: Sep. 16, 2003

(54) COMBINED ORGANIC/INORGANIC POLYOLS IN WATERBORNE FILM-FORMING COMPOSITIONS

(75) Inventors: Joseph A. Klanica, Sarver, PA (US); Brian K. Rearick, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/991,924

(22) Filed: Nov. 26, 2001

(65) Prior Publication Data

US 2002/0132909 A1 Sep. 19, 2002

Related U.S. Application Data

(60) Provisional application No. 60/258,927, filed on Dec. 29, 2000.

(51) Int. Cl.$^7$ ................................................ C08G 77/44
(52) U.S. Cl. .................. 524/506; 524/507; 524/457; 524/588; 524/591; 524/839; 525/100; 525/102; 525/123; 525/455

(58) Field of Search .................................. 524/506, 507, 524/457, 588, 591, 839; 525/100, 102, 123, 455

(56) References Cited

U.S. PATENT DOCUMENTS

| | | | |
|---|---|---|---|
| 5,466,745 A | 11/1995 | Fiori et al. .................. 524/801 |
| 6,005,045 A | * 12/1999 | Klanica ....................... 524/507 |
| 6,046,276 A | 4/2000 | Ambrose et al. ........... 525/101 |
| 6,387,997 B1 | * 5/2002 | Grolemund et al. ........ 524/506 |

* cited by examiner

Primary Examiner—David W. Wu
Assistant Examiner—Satya Sastri
(74) Attorney, Agent, or Firm—William J. Uhl

(57) ABSTRACT

A water dispersible polyurethane dispersion suitable for use as a curable film-forming composition is provided wherein the dispersion comprises, in water, the reaction product of (i) an acrylic polyol having hydrophilic groups, (ii) a polyol hydrosilylation reaction product of an alkylpolysiloxane and an unsaturated hydroxyalkyl compound, and (iii) a polyisocyanate component. Preferably, the acrylic polyol comprises a copolymer containing aromatic groups and having a glass transition temperature of at least about 0° C.

22 Claims, No Drawings

COMBINED ORGANIC/INORGANIC POLYOLS IN WATERBORNE FILM-FORMING COMPOSITIONS

CROSS-REFERENCE TO RELATED APPLICATION

This application claims the benefit of U.S. Provisional Application Serial No. 60/258,927, filed Dec. 29, 2000, which is hereby incorporated by reference.

BACKGROUND OF THE INVENTION

This invention relates to improvements in waterborne coating compositions of the type that comprise polyisocyanate crosslinking agents and acrylic copolymers having groups that are reactive with isocyanates. In particular, the improvements address the tendency of such coating compositions to develop gaseous inclusions during application of the coating, drying, and/or curing. These gaseous inclusions can cause visible defects that detract from the appearance of the finish of the coated article.

U.S. Pat. No. 5,466,745 to Fiori et al. discloses polyisocyanate crosslinking agents that can be emulsified in water with a surface active material reactive with isocyanates, and the emulsion may be used to form a curable film-forming composition. The emulsified materials are in the form of an oil-in-water emulsion that exhibits good stability even though the polyisocyanate and isocyanate reactive material are highly reactive when applied as a film.

An improvement in the type of composition disclosed by Fiori et al. is the subject of co-pending, commonly owned U.S. Pat. No. 6,005,045. In that patent, a surface active material reactive with isocyanate (e.g., polyol with carboxylate functionality) is used to disperse the polyisocyanate component as in Fiori et al. But improved hardness is attained in the cured coating by avoiding the use of surface active polyols having low $T_g$ as was required by the Fiori et al. patent. The composition of the 6,005,045 patent is characterized by (a) an aromatic group-containing polyisocyanate crosslinking agent which is non-dispersible in water and which contains at least two reactive isocyanate groups, at least one of which is a tertiary isocyanate group; and (b) a surface active isocyanate-reactive material comprising an active hydrogen-containing acrylic copolymer having a glass transition temperature of at least about 0° C. (preferably greater) prepared from a mixture of polymerizable ethylenically unsaturated monomers comprising about 5 to about 80 (preferably about 10 to about 40) percent by weight, based on the total solid weight of monomers used to prepare the copolymer, of an ethylenically unsaturated aromatic monomer.

Although these improvements in waterborne polyurethane coatings have been advantageous, further improvements are desired toward avoiding gaseous inclusions that cause visible defects. It would be desirable to provide a waterborne film-forming composition containing a polyisocyanate curing agent and an isocyanate reactive material that results in a cured finish having fewer defects originating from gaseous inclusions.

SUMMARY OF THE INVENTION

In accordance with the present invention, an aqueous polymeric dispersion is provided that can be used as a coating composition comprising:

(A) water, having dispersed therein:
(B) the mixture of:
 (i) an acrylic polyol having hydrophilic groups;
 (ii) a polyol hydrosilylation reaction product of an alkylpolysiloxane and an unsaturated hydroxyalkyl compound; and
 (iii) a polyisocyanate component.

Such a composition has been found to have a marked reduction in defects arising from gaseous inclusions. At the same time, the composition possesses a combination of properties typically sought for use as a film-forming composition (i.e., paint for providing a protective and/or decorative coating on a substrate) and can be cured at ambient or elevated temperatures. The aqueous compositions are stable and yet have good reactivity to form a cured coating when applied as a thin layer onto a substrate.

A multi-component composite coating composition is also provided by the present invention. The coating composition comprises a base coat deposited from a pigmented film-forming composition of a variety of known types and a substantially transparent top coat, or "clear coat," applied over the base coat in which the transparent coat is deposited from the aqueous dispersion of the present invention.

DETAILED DESCRIPTION

Suitable polyisocyanates for use as the polyisocyanate component in the composition of the present invention include liquid or solid polyisocyanate compounds containing at least two reactive (unblocked) isocyanate groups. The advantages of the aforesaid U.S. Pat. No. 6,005,045 can also be attained if the polyisocyanate includes an aromatic group and at least one of the isocyanate groups is a tertiary isocyanate group. By aromatic is meant aryl, alkylaryl, and arylalkyl bound isocyanates. Such polyisocyanates are themselves typically characterized as being substantially hydrophobic and non-dispersible in water. Mixtures of polyisocyanates are also suitable. Examples of appropriate polyisocyanates for a combination of desirable properties include, but are not limited to, meta-α,α,α',α'-tetramethylxylylenediisocyanate, para-α, α, α',α'-tetramethylxylylenediisocyanate, as well as biurets and asocyanurates of diisocyantes, wherein at least one of the diisocyanates used to prepare the biuret or isocyanurate contains a tertiary isocyanate group.

In some embodiments the polyisocyanate comprises a urethane adduct of a polyol with a diisocyanate containing at least one tertiary isocyanate group. Suitable polyols include, for example, ethylene glycol, propylene glycol, neopentyl glycol, trimethylolpropane, pentaerythritol, and the like. Oligomeric and polymeric polyols are also suitable.

The acrylic polyol component of the present invention contains both (i) functionality capable of reacting with isocyanate groups and (ii) hydrophilizing functionality capable of rendering the surface active isocyanate reactive material water dispersible.

In some embodiments the acrylic polyol is an acrylic copolymer having the hydrophilizing groups and isocyanate-reactive functionality incorporated into the polymer via appropriate monomer selection or subsequent modification. Examples of monomers that may be utilized to synthesize the acrylic polyol include carboxyl group-containing ethylenically unsaturated monomers and hydroxyl group-containing ethylenically unsaturated monomers.

The expression "isocyanate-reactive" functionality as utilized herein refers to the presence of functional groups that are reactive with isocyanate groups under conditions suitable for cured coating formation. Such isocyanate-reactive functionality is generally well known to those skilled in the coatings art and includes, most commonly, active hydrogen-containing functionality such as hydroxyl and amino groups. Hydroxyl functionality is typically utilized as the isocyanate-reactive functionality in coatings and is preferred for use in the present invention.

Hydrophilizing functionality is also well known to those skilled in the coatings art and includes, most commonly, anion generating, cation generating and hydrophilic non-ionic functional groups. By anion generating and cation generating are meant functionality such as carboxyl (anion generating) or amino (cation generating) which, when appropriately neutralized, becomes hydrophilic in nature. Hydrophilic non-ionic functionality is, in and of itself, hydrophilic in nature, such as alkylene oxide units. The amount of hydrophilizing functionality present in the acrylic polyol should, upon at least partial neutralization of the anion generating or cation generating groups (if present), be sufficient to render the polyol water-dispersible.

It is preferred, but not necessary, that the acrylic polyol used in the present invention be in accordance with the disclosure in U.S. Pat. No. 6,005,045. There, the active hydrogen-containing acrylic copolymers have a glass transition temperature ($T_g$) greater than about 0° C. The $T_g$ is described in PRINCIPLES OF POLYMER CHEMISTRY, Flory, Cornell University Press, Ithaca, N.Y., 1953, at pages 52–57. The $T_g$ can be calculated as described by Fox in *Bull. Amer. Physic. Society*, 1,3, page 123 (1956). The $T_g$ can be measured experimentally by using a penetrometer such as a Du Pont 940 Thermomedian Analyzer. The $T_g$ of the polymers as used herein refers to the calculated values unless otherwise indicated.

Suitable acrylic polyols are copolymers of one or more polymerizable acrylic monomers, at least some of which include hydrophilic functionality such as acid functional acrylic monomers, amine functional acrylic monomers, hydroxyl functional acrylic monomers. The copolymers may also be made with additional polymerizable unsaturated monomers such as vinyl monomers. The copolymers may be prepared in organic solvent using conventional free radical polymerization techniques. The copolymers of the 6,005,045 patent specifically contain about 5 to about 80, preferably about 10 to about 40 percent by weight, based on the total solid weight of monomers used to prepare the acrylic copolymer, of a polymerizable ethylenically unsaturated aromatic monomer; from about 5 to about 80, preferably from about 10 to 40 percent by weight, based on the total solid weight of monomers used to prepare the polymer, of an ethylenically unsaturated, hydroxyl functional acrylic monomer; and about 20 to about 95, preferably from about 30 to about 70 percent by weight, based on the total solid weight of monomers used to prepare the acrylic copolymer, of at least one ethylenically unsaturated monomer different from the other two named above.

The ethylenically unsaturated aromatic monomer used to synthesize the acrylic polyol may be selected from monomers such as styrene and alpha-methyl styrene, including substituted styrene or substituted alpha-methyl styrene where substitution is in the para position and is a linear or branched alkyl group having from about 1 to about 20 carbon atoms, for example, vinyl toluene,4-vinylanisole, and 4-vinylbenzoic acid. Also the ethylenically unsaturated aromatic monomer may contain fused aryl rings. Examples include 9-vinylanthracene and 9-vinylcarbazole. Mixtures of monomers may also be used. By "monomer" is meant true monomer; i. e., it is not intended to include dimers, such as alpha-methyl styrene dimer, trimers, or oligomers.

The ethylenically unsaturated hydroxyl functional monomer used to synthesize the acrylic polyol may be selected from, for example, hydroxyethyl acrylate, hydroxyethyl methacrylate, hydroxypropyl acrylate, hydroxypropyl methacrylate, hydroxybutyl acrylate, hydroxybutyl methacrylate, and mixtures thereof, with hydroxyethyl methacrylate being preferred.

Additional different ethylenically unsaturated monomers used to prepare the acrylic polyol include acid group-containing acrylic monomers such as acrylic acid and methacrylic acid; amine groups containing monomers such as dimethylaminoethyl methacrylate, tert-butylaminoethyl methacrylate; and meta-isopropenyl-α, α-dimethyl benzylamine; alkyl esters of acrylic acid or methacrylic acid such as those having 1–10 carbon atoms in the alkyl group such as methyl methacrylate, butyl acrylate, butyl methacrylate, 2-ethylhexyl methacrylate and cyclohexyl methacrylate and other polymerizable ethylenically unsaturated monomers such as nitriles such as acrylonitrile and methacrylonitrile; vinyl and vinylidene halides such as vinyl chloride and vinylidene fluoride and vinyl esters such as vinyl acetate.

Acid and amine functional monomers such as acrylic and methacrylic acid and dimethylaminoethyl methacrylate, tert-butylaminoethyl methacrylate; and meta-isopropenyl-α,α-dimethylobenzyl amine are preferred because upon neutralization of the acid or amine group, the copolymer is made hydrophilic. The acid or amine functional monomer are used in amounts of up to about 25% by weight, preferably about 1.0 to about 10.0%, based on total solid weight of monomers used to prepare the acrylic polymer. The alkyl esters of acrylic and methacrylic acid are used in amounts of up to about 89%, preferably about 30 to about 80% by weight, based on total solid weight of monomers used to prepare the acrylic copolymer. The other copolymerizable ethylenically unsaturated, when used are used in amounts of up to about 80%, preferably about 10 to about 40%, by weight based on total solid weight of monomers used to prepare the acrylic copolymer.

The acrylic copolymer typically has a number average molecular weight ($M_n$) of about 700 to about 50,000, preferably about 1000 to about 12,000 as determined by gel permeation chromatography using a polystyrene standard, an acid number, in the case of anion generating groups, of about 15 to about 150 mg KOH/g resin, preferably about 20 to about 70 mg KOH/g resin, more preferably about 20 to about 35 mg KOH/g resin; and an amount of active hydrogen groups from about 2.5% to about 6% by weight, preferably about 3% to about 5% by weight, more preferably about 3.5% to about 4.5% by weight, on a 100% solids basis.

The second polyol material employed in the compositions of the present invention comprise hydrosilylation reaction products of an alkylpolysilane and a compound having a hydroxyl group and unsaturation reactable with the alkylpolysilane. The alkylpolysilanes are generally those of the formula:

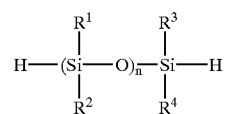

where n=1 to 10

R1, R2, R3, and R4 are independently H or lower alkyl groups. Each S-H site in the above structure is a potential reaction site in the hydrosilylation reaction with an unsaturated compound, particularly a compound with terminal unsaturation such as a vinyl compound or an allyl compound of the general structure

$R^5$ may be a wide range of groups, but for the particular application of automotive refinish coating, $R^5$ is preferably an alkenyl or alkoxy group. When used with the other particular components of the preferred coating embodiments disclosed herein (which are intended to be sprayable), it is preferred that the hydrosilylation reaction product does not substantially increase the viscosity of the compositions, and accordingly, it is preferred that the molecular weight of the hydrosilylation product be minimized for those embodiments. Therefore, to minimize the molecular weight for those embodiments, n is preferably one and $R^1$, $R^2$, $R^3$, and $R^4$ are preferably methyl for the silane reactant. It should be apparent that if viscosity reducing measures are taken with other components of the coating composition, or if the compositions need not be sprayable, larger molecular weights would be acceptable. Another reason to prefer that n be a small number is that introducing a limited amount of silicon in to the coating was found to be advantageous, but larger amounts had a negative effect. A preferred category of lower molecular weight unsaturated hydroxy compounds usable in the hydrosilylation reaction are the allyloxyalkanols, such as allyloxyethanol and allyloxypropanol.

When coating compositions are formulated from the emulsifiable compositions of the present invention, preferably the polyol crosslinking materials and the surface active isocyanate reactive material comprise the primary film-forming components of the coating. The components are preferably present in amounts such that the NCO:active hydrogen group ratio is in the range of about 0.5:1 to about 2:1, preferably about 0.8:1 to about 1.2:1.

The emulsifiable compositions of the present invention, particularly when used as coating compositions, may also comprise additional ingredients such as, for example, neutralizing agents for rendering the surface active isocyanate reactive material water-dispersible, cure catalysts, and relatively minor amounts of organic solvent.

When an acid group is present on the isocyanate reactive material, any base may be used as the neutralizing agent to produce an anionic surface active material. Normally, a base capable of converting a carboxyl group to a carboxylate ion is used as the neutralizing agent, including organic and inorganic bases such as sodium and potassium hydroxide, sodium and potassium carbonate, and amines such as ammonia, primary, secondary, and tertiary amines. Similarly, when an amine group is present on the acrylic copolymer, any acid may be used as the neutralizing agent to produce a cationic surface active material. When utilized, the neutralizing agents may be present in the organic phase to be emulsified, the aqueous medium into which the organic phase is emulsified, or both. The total amount of neutralizing agent should be sufficient to emulsify the polyisocyanate, the acrylic copolymer and other optional ingredients and the aqueous phase in the form of an oil-in-water emulsion.

Besides the polyisocyanate, the acrylic copolymer and water, the composition can contain optional ingredients, particularly cure catalyst and organic solvents.

Cure catalysts for isocyanates are well known to those skilled in the art. Preferred are organometallic catalysts and, particularly, organotin compounds such as dibutyltin diacetate, dibutyltin dioxide, dibutyltin dilaurate and the like.

The organic solvents are generally those present in the various components. For example, many coatings components are not commercially available on a 100% solids basis, but are rather a somewhat lower solids content in an appropriate solvent. Preferably, no other organic solvent is or need be added to the emulsifiable compositions (or emulsion) to achieve acceptable results.

Other optional ingredients such as, for example, plasticizers, surfactants, thixotropic agents, anti-gassing agents, organic cosolvents, flow controllers, anti-oxidants, UV light absorbers and similar additives conventional in the art may be included in the composition.

The oil-in-water emulsions of the present invention are produced by the steps of:

(a) admixing the components forming the organic phase of the emulsion, organic phase may be defined as greater than 50% organic by weight; and thereafter (b) contacting the mixture with an aqueous medium in proportions and under conditions so as to yield an oil-in-water emulsion.

The emulsions can be prepared by any number of well-known techniques, but are preferably prepared by adding the aqueous medium, either continuously or in portions, to the organic phase under mixing conditions until phase inversion occurs. Additional aqueous medium can then be added to adjust the emulsion to the desired solids content and viscosity.

The aqueous medium may comprise solely water, or may comprise other components such as the neutralizing agent, as indicated above. The aqueous medium may additionally include one or more other auxiliaries and additives common in the art, as well as minor amounts of water miscible organic solvent to aid in emulsification or to adjust viscosity. Preferably any such additional ingredients will be added to the organic phase and the aqueous medium will comprise solely water or water plus a neutralizing agent.

The oil-in-water compositions prepared by the above procedure may be used as curable film-forming compositions (coatings).

Film-forming compositions of the present invention may be cured at ambient temperature; i. e., 20 to 25° C., or heated up to as high as about 93° C. (200° F.) as desired to effect cure.

The film-forming composition of the present invention is typically used as a clear coat applied alone to a substrate or on top of a colored base coat as part of a multi-component composite coating composition. Suitable base coats include any known to those skilled in the art. Base coats curable at ambient temperatures are preferred.

Alternatively, the composition of the present invention may contain color pigments conventionally used in surface coatings and may be used as a base coat or high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

Color pigments conventionally used in surface coatings are suitable and include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

When present, the pigment is incorporated into the coating composition in amounts of about 1 to about 80 percent by weight based on the total weight of coating solids. The metallic pigment is employed in amounts of about 0.5 to about 25 percent by weight based on the total weight of coating solids.

The film-forming compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of a base coat composition to the substrate, a film of the base coat is formed on the substrate. Typically, the base coat thickness will be about 0.01 to about 5 mils (about 0.254 to about 127 microns), preferably about 0.1 to about 2 mils (about 2.54 to about 50.8 microns) in thickness.

After application of the base coat to the substrate, a film is formed on the surface of the substrate by driving solvent, i. e., organic solvent and/or water, out of the base coat film by an air drying period, sufficient to ensure that the clear coat can be applied to the base coat without dissolving the base coat composition. Suitable drying conditions will depend on the particular base coat composition, and on the ambient humidity with certain waterborne compositions, but in general a drying time of from about 5 to 60 minutes will be adequate to ensure that mixing of the two coats is minimized. At the same time, the base coat film is adequately wetted by the clear coat composition so that satisfactory intercoat adhesion is obtained. Also, more than one base coat and multiple clear coats may be applied to develop the optimum appearance. Usually between coats, the previously applied coat is flashed; that is, exposed to ambient conditions for about 1 to 20 minutes.

The clear topcoat composition may be applied to the base coated substrate by any conventional coating technique such as brushing, spraying, dipping or flowing, but spray applications are preferred because of superior gloss. Any of the known spraying techniques may be employed such as compressed air spraying, electrostatic spraying and either manual or automatic methods.

After application of the clear coat composition to the base coat, the coated substrate is allowed to cure at ambient temperature. The coated substrate may also be heated as desired, often up to about 93° C. (200° F.). In the curing operation, solvents are driven off and the film-forming materials of the clear coat and the base coat are each crosslinked. The curing operation is usually carried out at a temperature in the range of from 20 to 25° C., or up to about 93° C. The thickness of the clear coat is usually from about 0.5 to about 5 mils (about 12.7 to about 127 microns), preferably about 1.2 to about 3 mils (about 30.5 to about 76.2 microns).

The invention will be further described by reference to the following examples.

SYNTHESIS EXAMPLES

Example A illustrates the preparation of one embodiment of acrylic copolymer polyol that has high $T_g$ and that may be used in combination with a silane polyol in the coating compositions of present invention. Examples B, C, D, and E illustrate synthesis of various embodiments of silane polyol in accordance with the present invention. All portions are by weight unless otherwise noted.

Example A

An acrylic copolymer containing 19 weight percent styrene, 41.5 weight percent butyl acrylate, 35 weight percent hydroxyethyl methacrylate, and 4.5 weight percent acrylic acid was prepared as follows:

A solvent combination of 288.6 parts DOWANOL PM Acetate (dipropylene glycol monomethyl ether acetate, available from Dow Chemical Co.) and 589.8 parts Butyl CELLOSOLVE Acetate (2-butoxyethyl ester of acetic acid, available from Union Carbide Chemicals and Plastics Co., Inc.) was charged into a four-neck flask equipped with a thermocouple, a reflux condenser with a nitrogen inlet adapter and a stirrer, and heated to reflux under a nitrogen gas blanket. An initiator feed mixture of 283.6 parts LUPERSOL 575 (di-tert-amyl peroxy-2-ethylhexanoate from Atofina) and 102.2 parts of BUTYL CELLOSOLVE acetate was prepared. A monomer feed mixture of of 897.6 parts of styrene, 1957.6 parts butyl acrylate, 1652.0 parts hydroxyethyl methacrylate, 214.2 parts acrylic acid, and 94.2 parts mercaptoethanol was prepared. The initiator mixture was added dropwise to the reaction vessel over a period of about 3.5 hours while maintaining the reaction at reflux. Ten minutes after the start of the initiator addition, the monomer feed was added dropwise to the reaction vessel over a period of 3 hours. At the completion of the addition of the monomer feed, a rinse of 33.75 parts DOWANOL PM acetate was added. At the completion of the initiator addition, a rinse of 33.75 parts DOWANOL PM acetate was added, and the reaction mixture was held at reflux for 1 hour. After the completion of the hold time, the reaction mixture was cooled. The final product had a solids content of about 73 percent, Mn of 1866 and Mw of 7421 as determined by gel permeation chromatography using a polystyrene standard.

Example B

Hydrosilylation of 2-allyloxyethanol with 1,1,3,3-tetramethyldisiloxane

To a stirred, heated reactor flask were charged 458.25 grams of 2-allyloxyethanol and 0.037 grams sodium acetate, and the charge was heated to 75° C. under a nitrogen blanket. A total charge of 286.30 grams of 1,1,3,3-tetramethyldisiloxane (TMDS) was added to the reactor flask in the following order. Initially 5 percent of the TMDS charge was added at the 75° C. temperature. After holding the mixture for 5 minutes, 0.299 milliliters of $H_2PtCl_6$ catalyst in isopropanol was added, and the temperature was raised until an exothermic reaction was observed. The remainder of the TMDS charge was gradually added while maintaining the temperature no higher than 95° C. After the reaction was completed, the product was held for 1.5 hours. The reaction product had a total solids content of 74.26 weight percent, an OH value of 329.1, Mw of 644, Mn of 322, and Mz of 926.

Example C

Hydrosilylation of allylmonopropoxylate with 1,1,3,3-tetramethyldisiloxane

To a stirred, heated reactor flask were charged 116.0 grams of allylmonopropoxylate and a small amount of sodium acetate, and the charge was heated to 75° C. under a nitrogen blanket. A total charge of 67 grams of 1,1,3,3-tetramethyidisiloxane (TMDS) was added to the reactor flask in the following order. Initially 5 percent of the TMDS charge was added at the 75° C. temperature. After holding the mixture for 5 minutes, 1.406 grams of $H_2PtCl_6$ catalyst in isopropanol was added, and the temperature was raised until an exothermic reaction was observed. The remainder of the TMDS charge was gradually added while maintaining the temperature no higher than 95° C. After the reaction was completed, the product was held for 1.5 hours. The reaction product had a total solids content of 77.80 weight percent, Mw of 555, Mn of 362, and Mz of 868.

Example D

Hydrosilylation of 2-allyloxyethanol with 1,1,3,3-tetramethyidisiloxane

To a stirred, heated reactor flask were charged 458.25 grams 2-allyloxyethanol and 0.040 grams sodium acetate, and the charge was heated to 75° C. under a nitrogen blanket. A total charge of 308.32 grams 1,1,3,3-tetramethyldisiloxane (TMDS) was added to the reactor flask in the following order. Initially 5 percent of the TMDS charge was added at the 75° C. temperature. After holding the mixture for 5 minutes, 0.322 milliliters of $H_2PtCl_6$ catalyst in isopropanol was added, and the temperature was raised until an exothermic reaction was observed. The remainder of the TMDS charge was gradually added while maintaining the temperature no higher than 95° C. After the reaction was completed, the product was held for 1.5 hours. The reaction product had a total solids content of 76.72 weight percent, an OH value of 230.1, Mw of 691, Mn of 561, and Mz of 880.

Example E

Hydrosilylation of 2-allyloxyethanol and trimethylpropanol diallylether with 1,1,3,3-tetramethyidisiloxane An initial charge of 286.3 grams 2-allyloxyethanol and 0.05 grams sodium acetate in a stirred, heated reactor flask was heated to 75° C. under nitrogen. A total charge of 357.8 grams 1,1,3,3-tetramethyldisiloxane (TMDS) was added to the reactor flask in separate additions as described hereafter. Initially 5 percent of the TMDS charge was added at the 75° C. temperature and held for 5 minutes. Then 0.416 milliliters of $H_2PtCl_6$ catalyst in isopropanol was added, and while monitoring for exothermic reaction, the temperature was raised to 85° C. until an exothermic reaction was observed. The temperature during the reaction was thereafter maintained to a maximum of 95° C.–105° C. Half of the remainder of the TMDS charge was then gradually added, and thereafter, the remainder of the TMDS was added concurrently with 300 grams trimethylolpropane diallylether. The reaction mixture was held until analysis indictated reaction of Si—H was essentially complete. The product was cooled to 60° C. and 1.38 grams of a 35 percent solution of hydrogen peroxide in water was added for color correction. The reaction product had a theoretical OH equivalent weight of 249 and a measured OH equivalent weight of 225.

Example F

Hydrosilylation of 2-allyloxyethanol and trimethylpropanol diallylether with 1,1,3,3-tetramethyidisiloxane Substantially the same process as described in Example E was carried out, but with the following amounts: 1,210.10 parts by weight 2-allyloxyethanol, 0.85 parts by weight sodium acetate, 1,467.70 parts by weight 1,1,3,3-tetramethyidisiloxane (TMDS), 0.11 parts by weight $H_2PtCl_6$ in 1.70 parts by weight isopropanol, 1,230.40 parts by weight trimethylolpropane diallylether, and 8.50 parts by weight hydrogen peroxide (35%).

Coating Examples

Examples 1 and 2 are waterborne, polyurethane, clear coating compositions in accordance with the present invention. Each includes one of the siloxane polyols described above in combination with the acrylic polyol of Example A. Example 3 is comparative, and does not contain siloxane polyol.

All compositions were prepared by premixing the acrylic copolymer(s) with the neutralizing amine, surfactant, additives, catalyst, and solvent to form a stable "Component 1." The polyisocyanates were co-mixed to form a stable "Component 2," which was then mixed into Component 1. About 80 percent of the deionized water (Component 3) was then added and mixed until phase inversion occurred to form an oil-in-water emulsion. Additional portions of the remaining deionized water were added to yield a sprayable viscosity (25 to 30 seconds Zahn #2).

EXAMPLE 1

EXAMPLE 1

| Ingredient | Weight % of total solids | Solution Weight (g) |
|---|---|---|
| COMPONENT 1 | | |
| Acrylic polyol of Example A | 27.6 | 37.8 |
| Siloxane diol of Example B | 10.6 | 10.60 |
| Dimethyl ethanolamine | 1.6 | 1.6 |
| TINUVIN 384[1] | 2.4 | 2.4 |
| TINUVIN 292[2] | 1.6 | 1.6 |
| BYK 375[3] | 0.4 | 0.4 |
| COMPONENT 2 | | |
| CYTHANE 3174[4] | 42.8 | 57.8 |
| TOLONATE HDT-LV[5] | 13.0 | 13.0 |
| COMPONENT 3 | | |
| Deionized water | | 105 |

[1]Ultraviolet light stabilizer available from Ciba-Geigy Corp.
[2]Bis(1,2,2,6,6-pentamethyl-4-piperidinyl) sebacate sterically hindered light stabilizer available from Ciba Geigy Corp.
[3]Solution of a polyether-polyester modified hydroxy functional dimethylpolysilxane from BYK-Chemie, Wesel, Germany.
[4]Adduct of trimethylolpropane with meta-a,a,a',a'-tetramethylxylylenediisocyanate, 74% solids in butyl acetate, 10.2 weight percent free isocyanate, available from CYTEC Industries, Stamford, CT
[5]Trimer of hexamethylene diisocyanate, available from Phone Poulenc, Cranbury, New Jersey, USA.

EXAMPLE 2

| Ingredient | Weight % of total solids | Solution Weight (g) |
|---|---|---|
| COMPONENT 1 | | |
| Acrylic polyol of Example A | 24.4 | 33.7 |
| Siloxane diol of Example E | 13.9 | 14.0 |
| Dimethyl ethanolamine | 2.1 | 2.1 |
| TINUVIN 384[1] | 2.4 | 2.4 |
| TINUVIN 292[2] | 1.6 | 1.6 |
| BYK-375[3] | 0.4 | 0.4 |

-continued

| Ingredient | Weight % of total solids | Solution Weight (g) |
|---|---|---|
| COMPONENT 2 | | |
| CYTHANE 3174[4] | 42.4 | 57.8 |
| TOLONATE HDT-LV[5] | 12.9 | 13.0 |
| Isophorone diisocyanate | | 5.7 |
| COMPONENT 3 | | |
| Deionized water | | 107 |

EXAMPLE 3 (COMPARATIVE)

| Ingredient | Weight % of total solids | Solution Weight (g) |
|---|---|---|
| COMPONENT 1 | | |
| Acrylic polyol of Example A | 42.5 | 64.1 |
| Siloxane diol of Example B | 0 | 0 |
| Dimethyl ethanolamine | 2.4 | 2.6 |
| TINUVIN 384[1] | 2.7 | 3 |
| TINUVIN 292[2] | 1.8 | 2 |
| BYK-375[3] | 0.5 | 0.5 |
| COMPONENT 2 | | |
| CYTHANE 3174[4] | 38.4 | 57.1 |
| TOLONATE HDT-LV[5] | 11.7 | 12.9 |
| COMPONENT 3 | | |
| Deionized water | | 167 |

For each clear coat composition being tested, three sets of steel test panels measuring 4 inches×12 inches (10.16 cm×30.48 cm) were used, initially coated with an electrodeposited primer and a primer surfacer available from PPG Industries, Inc. as ED5000 and GPX05379, respectively. Two of the panels from each set were wet sanded with #600 grit paper, solvent wiped and then treated with an epoxy/amine primer sealer. These two panels were then coated with a black waterborne base coat, available from PPG Industries, Inc., under the name ENVIROBASE®BC9700. Drying times prior to application of the compositions of the examples were variable and were at ambient temperature. The third panel in each set (i.e., without sanding, sealer, or basecoat), was used for determining the Tukon Hardness of the applied clear coat without the influence of a softer base coat.

Each clear coat composition being tested was spray applied onto the three test panels prepared as described above, using conventional spray equipment. For Examples 1, 2, and 3, the clear coat was applied at a thickness of approximately 1.5–3.0 mils (38.1–76.2 microns) in two coats with an approximately 10 minute ambient temperature flash between coats. For the comparison of Examples 4 and 5, generally higher thicknesses were applied with up to four coats. Results for Examples 1, 2, and 3 are reported in Table 1, and for Examples 4 and 5 in Table 2. Some of the panels were coated with the compostions of Examples 4 and 5 without providing a between-coat flash off period, as indicated in Table 2.

TABLE 1

| | Example 1 | Example 2 | Example 3 (Comparative) |
|---|---|---|---|
| Popping | None | None | Severe |
| Gloss | 86 | 88 | 86 |
| DOI | 40 | 55 | 60 |
| Tukon hardness (96 hours) | 9.9 | — | 12.4 |
| Tukon hardness (7 days) | 16.6 | 13.7 | 15.8 |

EXAMPLE 4

| Ingredient | Solution Weight (g) |
|---|---|
| COMPONENT 1 | |
| Acrylic polyol of Example A | 33.7 |
| Siloxane diol of Example F | 14.0 |
| Dimethyl ethanolamine | 2.1 |
| TINUVIN 384[1] | 2.4 |
| TINUVIN 292[2] | 1.6 |
| BYK-375[3] | 0.4 |
| COMPONENT 2 | |
| CYTHANE 3174[4] | 57.9 |
| TOLONATE HDT-LV[5] | 13.0 |
| Isophorone diisocyanate | 5.7 |
| COMPONENT 3 | |
| NATROSOL* thickener | 38.0 |
| Deionized water | 120 |
| COMPONENT 4 | |
| ACRYSOL RM-8W** thickener | 50.0 |
| Deionized water | 130 |

*Modified hydroxyethylcellulose thickener from Hercules Inc.
**Non-ionic hydrophobically modified ethylene oxide based urethane block copolymer rheology modifier from Rohm & Haas.

EXAMPLE 5 (COMPARATIVE)

A coating composition otherwise the same as Example 4 was made, but omitting the siloxane diol component.

TABLE 2

| Panel | Dry Film Thickness (mils) | Defect Rating | Defect density - per cm[2] |
|---|---|---|---|
| Example 5 (Comparative) | 2.5–2.6 | Moderate | 12 |
| | | | 15 |
| | | | 29 |
| | | | 15 |
| Example 4 | 2.0–2.3 | None | 6 |
| | | | 3 |
| | | | 0 |
| | | | 0 |
| | | | 0 |
| | | | 0 |
| Example 5 (Comparative) No Flash | 2.5 | Moderate | 15 |
| | | | 9 |
| | | | 9 |
| | | | 21 |
| | | | 29 |
| | | | 15 |
| Example 4 No Flash | 2.0 | Very Slight | 6 |
| | | | 3 |
| | | | 3 |

What is claimed is:

1. An aqueous polymeric dispersion comprising:
   (A) water, having dispersed therein:
   (B) the mixture of:
      (i) an acrylic polyol having hydrophilic groups;
      (ii) a polyol hydrosilylation reaction product of an alkylpolysiloxane and an unsaturated hydroxyalkyl compound;
      (iii) a polyisocyanate component.

2. The composition of claim 1 wherein the polyisocyanate component (iii) comprises a hydrophobic, aromatic group-containing polyisocyanate containing at least two reactive isocyanate groups, at least one of which is a tertiary isocyanate group.

3. The composition of claim 1 wherein the acrylic polyol (i) comprises an acrylic copolymer having a glass transition temperature of at least about 0° C., prepared from a mixture of polymerizable ethylenically unsaturated monomers containing from about 5 to about 80 percent by weight, based on the total solid weight of monomers used to prepare the acrylic copolymer, of an ethylenically unsaturated aromatic monomer.

4. The composition of claim 3 wherein the ethylenically unsaturated aromatic monomer is selected from the group consisting of styrene, alpha-methyl styrene, substituted styrene, substituted alpha-methyl styrene and ethylenically unsaturated monomers containing fused aryl rings.

5. The composition of claim 3 wherein the mixture of ethylenically unsaturated monomers contains about 5 to about 80 percent by weight, based on the total solid weight of monomers, of an ethylenically unsaturated, hydroxyl functional monomer.

6. The composition of claim 5 wherein the ethylenically unsaturated, hydroxyl functional monomer comprises hydroxyalkyl acrylate or hydroxyalkyl methacrylate.

7. The comoposition of claim 1 wherein the polyisocyanate component (iii) comprises a urethane adduct of a polyol with a diisocyanate containing at least one tertiary isocyanate group.

8. The composition of claim 7 wherein the polyol used to make the urethane adduct is trimethylolpropane.

9. The composition of claim 8 wherein the diisocyanate used to make the urethane adduct is meta-α,α,α',α'-tetramethylxylylenediisocyanate.

10. The composition of claim 1 wherein the polyol (ii) is the reaction product of an alkyldisiloxane and a vinyl-terminated alkoxyalkanol.

11. The composition of claim 10 wherein the alkyldisiloxane is tetramethyldisiloxane and the vinyl-terminated alkoxyalkanol is allyloxyethanol.

12. A curable film-forming composition comprising an aqueous medium having dispersed therein a polymeric composition comprising, as the primary film-forming component the reaction product of:
   (i) an acrylic polyol having hydrophilic groups;
   (ii) a polyol hydrosilylation reaction product of an alkyldisiloxane and an unsaturated hydroxyalkyl compound;
   (iii) a polyisocyanate component.

13. The composition of claim 12 wherein the polyisocyanate component (iii) comprises a hydrophobic, aromatic group-containing polyisocyanate containing at least two reactive isocyanate groups, at least one of which is a tertiary isocyanate group.

14. The composition of claim 12 wherein the acrylic polyol (i) comprises an acrylic copolymer having a glass transition temperature of at least about 0° C., prepared from a mixture of polymerizable ethylenically unsaturated monomers containing from about 5 to about 80 percent by weight, based on the total solid weight of monomers used to prepare the acrylic copolymer, of an ethylenically unsaturated aromatic monomer.

15. The composition of claim 14 wherein the ethylenically unsaturated aromatic monomer is selected from the group consisting of styrene, alpha-methyl styrene, substituted styrene, substituted alpha-methyl styrene and ethylenically unsaturated monomers containing fused aryl rings.

16. The composition of claim 14 wherein the mixture of ethylenically unsaturated monomers contains about 5 to about 80 percent by weight, based on the total solid weight of monomers, of an ethylenically unsaturated, hydroxyl functional monomer.

17. The composition of claim 16 wherein the ethylenically unsaturated, hydroxyl functional monomer comprises hydroxyalkyl acrylate or hydroxyalkyl methacrylate.

18. The composition of claim 12 wherein the polyisocyanate component (iii) comprises a urethane adduct of a polyol with a diisocyanate containing at least one tertiary isocyanate group.

19. The composition of claim 18 wherein the polyol used to make the urethane adduct is trimethylolpropane.

20. The composition of claim 18 wherein the diisocyanate used to make the urethane adduct is meta-α,α,α',α'-tetramethylxylylenediisocyanate.

21. The composition of claim 12 wherein the polyol (ii) is the reaction product of an alkyldisiloxane and a vinyl-terminated alkoxyalkanol.

22. The composition of claim 21 wherein the alkyldisiloxane is tetramethyldisiloxane and the vinyl-terminated alkoxyalkanol is allyloxyethanol.

\* \* \* \* \*